United States Patent
Diamanti et al.

(10) Patent No.: US 11,928,603 B2
(45) Date of Patent: Mar. 12, 2024

(54) MACHINE LEARNING (ML) MODELING BY DNA COMPUTING

(71) Applicant: KYNDRYL, INC., New York, NY (US)

(72) Inventors: Gary F. Diamanti, Durham, NC (US); Aaron K. Baughman, Bethesda, MD (US); Mauro Marzorati, Tampa, FL (US)

(73) Assignee: Kyndryl, Inc., New York, NY (US)

( * ) Notice: Subject to any disclaimer, the term of this patent is extended or adjusted under 35 U.S.C. 154(b) by 9 days.

(21) Appl. No.: 18/051,308

(22) Filed: Oct. 31, 2022

(65) Prior Publication Data

US 2023/0089824 A1 Mar. 23, 2023

Related U.S. Application Data

(62) Division of application No. 15/994,145, filed on May 31, 2018, now Pat. No. 11,531,934.

(51) Int. Cl.
*G06N 3/123* (2023.01)
*G06N 20/00* (2019.01)
*G06N 20/20* (2019.01)

(52) U.S. Cl.
CPC ............ *G06N 3/123* (2013.01); *G06N 20/00* (2019.01); *G06N 20/20* (2019.01)

(58) Field of Classification Search
CPC ......... G06N 3/123; G06N 20/00; G06N 20/20
See application file for complete search history.

(56) References Cited

U.S. PATENT DOCUMENTS

| | | | |
|---|---|---|---|
| 8,296,177 B2 | 10/2012 | Gluhovsky et al. | |
| 9,384,320 B2 * | 7/2016 | Church | G06N 3/123 |
| 11,531,934 B2 | 12/2022 | Diamanti et al. | |
| 2005/0216426 A1 | 9/2005 | Weston et al. | |
| 2010/0332430 A1 | 12/2010 | Caraviello et al. | |
| 2011/0044524 A1 | 2/2011 | Wang et al. | |
| 2015/0102216 A1 | 4/2015 | Röder et al. | |
| 2017/0116372 A1 * | 4/2017 | Baughman | G06N 20/00 |

FOREIGN PATENT DOCUMENTS

WO WO 2009047561 A1 4/2009

OTHER PUBLICATIONS

Watada, Junzo, and Rohani binti abu Bakar. "DNA computing and its applications." 2008 Eighth International Conference on Intelligent Systems Design and Applications. vol. 2. IEEE, 2008. (Year: 2008).*

International Search Report and the Written Opinion of the International Searching Authority for International Application No. PCT/IB2019/054334, filed May 24, 2019, dated Sep. 17, 2019, 13 pages.

(Continued)

*Primary Examiner* — Benjamin P Geib
(74) *Attorney, Agent, or Firm* — CANTOR COLBURN LLP; Erik Swanson

(57) ABSTRACT

Methods, computer program products, and systems are presented. The methods include, for instance: building, by one or more DNA processor, a DNA strand corresponding to a conditional expectation. The methods include, for instance: obtaining, by one or more DNA processor, a conditional expectation having a regularization metric.

20 Claims, 9 Drawing Sheets

(56) References Cited

OTHER PUBLICATIONS

International Search Report and the Written Opinion of the International Searching Authority for International Application No. PCT/IB2019/054334, filed May 24, 2019, dated Sep. 17, 2019.
P. Mell, et al. *"The NIST Definition of Cloud Computing"*, NIST Special Publication 800-145, Sep. 2011, Gaithersburg, MD.
S. Kumar *"A Proper Approach on DNA Based Computer"* American Journal of Nanomaterials, vol. 3, No. 1, 1-14, DOI: 10,1269/ajn-3-1-1, 2015.
Roman Zakharov, *"Ensemble Logistic Regression for Feature Selection"*, Universite catholique de Louvain, NBI 7036, pp. 133-144, Springer, 2011.
Adel Aloraini, *"Ensemble Feature Selection Methods for a Better Regularization of the Lasso Estimate in P>> N Gene Expression Datasets"* Machine Learning and Applications (ICMLA) 2013 12$^{th}$ International Conference, Doi: 10-1109/ICMLA.2013.116, Dec. 4-7, 2013, added to Library Apr. 10, 2014.
Yin, Xu-Cheng, et al.; "A novel classifier ensemble method with sparsity and diversity"; Neurocomputing, vol. 134; Jun. 25, 2014; pp. 214-221.
Li, Nan, et al.; "Selective ensemble under regularization framework"; International Workshop on Multiple Classifier Systems; Jun. 2009; pp. 293-303.
Watada, Junzo et al.; "DNA computing and its applications"; 2008 Eighth International Conference on Intelligent Systems Design and Applications; Nov. 26-28, 2008; pp. 288-294.
List of Kyndryl Patents or Patent Applications Treated as Related; George S. Blasiak; Oct. 31, 2022; 1 page.

\* cited by examiner

EQ LR
$$f(x) = \beta_0 + \beta_1 x_1 + \beta_2 x_2 + \cdots + \beta_n x_n$$

EQ EXP
$$E(Y|\bar{x}_t) = \beta_{0j} + \beta_{mn} x_t$$

EQ REG
$$E(Y|\bar{x}_t) = \beta_{0j} + \beta_{mn} x_t + \boldsymbol{R'(\bar{\beta})}$$

EQ RT
$$R'(\bar{\beta}) = RSS + R_n,$$
$$\text{where } RSS = \sum_{i=1}^{n}\left(y_i - \beta_0 - \sum_{j=1}^{p}\beta_0 x_{ij}\right)^2,$$
$$R_n = \lambda \sum_{j=1}^{p} R(\beta_i)$$

EQ LASSO
$$R(\beta_j) = |\beta_j|$$

EQ RR
$$R(\beta_j) = \beta_j^2$$

FIG. 5

MACHINE LEARNING (ML) MODELING BY DNA COMPUTING

CROSS-REFERENCE TO RELATED APPLICATIONS

This application is a divisional of U.S. patent application Ser. No. 15/994,145, filed May 31, 2018, entitled, "MACHINE LEARNING (ML) MODELING BY DNA COMPUTING" which is incorporated herein by reference in its entirety.

TECHNICAL FIELD

The present disclosure relates to machine learning technology, and more particularly to methods, computer program products, and systems for generating a machine learning model as being parallelly regularized by DNA computing.

BACKGROUND

In conventional machine learning (ML) technology, training data are often regularized in order to resolve the issue of overfitting of the training data by an ML model, in order to make the ML model useful for input data that differ from the training data. Such regularization of the training data is, however, a computation-intensive process. Also, because many regularization methods that are available today offer distinctive benefits in regularizing the ML model, heavily regularized training data are known to be necessary to render the ML model robust to be used for wide variety of input data.

SUMMARY

The shortcomings of the prior art are overcome, and additional advantages are provided, through the provision, in one aspect, of a method. The method for generating a machine learning model includes, for instance: identifying, by two or more processors, a training data set; defining, by the two or more processors, a window for an initial beta value, where the initial beta value represents bias for the identified training data set in respective conditional expectations; regularizing, by the two or more processors, the respective conditional expectations corresponding to each feature vector from the training data set, where two or more methods of regularization on the conditional expectations are performed in parallel for each feature vector; creating, by the two or more processors, a plurality of ensembles of models derived from the conditional expectations resulting from the regularizing; and producing, by the two or more processors, a best fit ensemble amongst the created ensembles as the machine learning model, where the machine learning model predicts targeted outcomes based on inputs distinctive from the training data set, where the two or more processors include one or more digital processor and one or more DNA processor. In one aspect, a method includes, for instance: identifying a training data set and defining a window for an initial beta value representing bias tolerated in formulating expectation conditional to each feature vector from the training data set. The conditional expectations are parallelly regularized by use of DNA computer. Amongst numerous combinations of candidate models, a best fit ensemble is produced as the machine learning model for predicting targeted outcomes based on inputs other than the training data set. In one aspect, a method includes, for instance: In one aspect, a method includes, for instance: building, by one or more DNA processor, a DNA strand corresponding to a conditional expectation, the conditional expectation corresponding to a feature vector from a training data set; amplifying, by the one or more DNA processor, nucleotides based on beta values for the conditional expectation from the building; encoding, by the one or more DNA processor, the amplified nucleotide as nucleobases; and adding, by the one or more DNA processor, the encoded nucleobases to the DNA strand from building. In one aspect, a method includes, for instance: obtaining, by one or more DNA processor, a conditional expectation having a regularization metric; building, by the one or more DNA processor, a DNA strand corresponding to the conditional expectation from the obtaining, the conditional expectation corresponding to a feature vector from a training data set; amplifying, by the one or more DNA processor, nucleotides based on beta values for the conditional expectation from the building; encoding, by the one or more DNA processor, the amplified nucleotide as nucleobases; adding, by the one or more DNA processor, the encoded nucleobase to the DNA strand from building; receiving, by the one or more DNA processor, a regularized DNA strand having a number for nucleic acids based on a regularization method; and concatenating, by the one or more DNA processor, the regularized DNA from the receiving to the DNA strand from adding.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5 depicts equations utilized in the regularization processes and the beta encoding process of the system, in accordance with one or more embodiments set forth herein;

DETAILED DESCRIPTION

Figure 1:
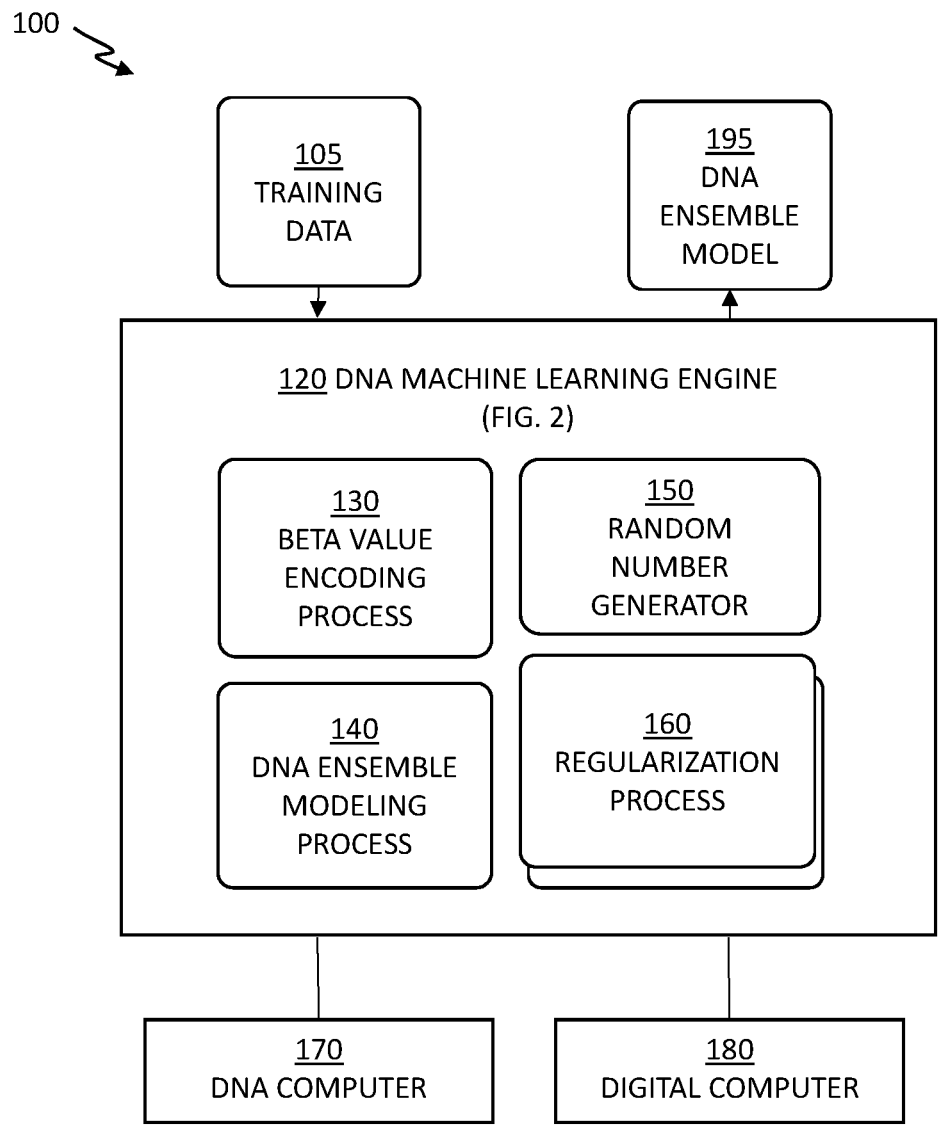
FIG. 1 depicts a system for machine learning modeling by DNA computing, in accordance with one or more embodiments set forth herein.

FIG. 1 depicts a system 100 for machine learning (ML) modeling by DNA computing, in accordance with one or more embodiments set forth herein.

DNA computing is a branch of computing which uses Deoxyribonucleic Acid (DNA), which is a thread-like chain of nucleotides carrying the genetic instructions used in the growth, development, functioning and reproduction of all known living organisms and many viruses. Accordingly, DNA computing also utilizes biochemistry, DNA nanotechnology, and/or molecular biology hardware, to describe and to solve problems that are conventionally processed by silicon-based, conventional computer technology. DNA computing may be used in conjunction with conventional digital computer technologies. DNA computing is particularly advantageous with respect to high parallelism, high speed computing as DNA computing utilizes the aspects of DNA that many different molecules of DNA concurrently form many DNA strands corresponding to many different possibilities and/or solutions to a problem presented.

In the context of modeling by machine learning (ML), overfitting refers to an issue of modeling that models training data too well, by learning details and noises in the training data to the extent that such details and noises negatively impact the performance of the model on new input data when applied. In order to resolve overfitting for an ML model, the training data is to be regularized such that the noises and random fluctuations in the training data would not be modeled into the ML model. In this specification, the term "regularization" indicates a process of resolving problems with ill-posed machine learning models such as overfitting and class imbalance, as well as dimensionality reduction of reducing the number of random variables for feature selection and feature extraction. In this specification, the term "overfitting" is used to represent purposes of using the regularization for machine learning models.

The system 100 includes a DNA machine learning engine 120 that generates a DNA ensemble model 195 based on learning from training data 105. The training data 105 to the DNA machine learning engine 120 is a set of data to train a machine learning model, which is referred to as the DNA ensemble model 195. As noted, the DNA machine learning engine 120 is devised to regularize the training data 105 in order to prevent and/or minimize aforementioned ill-posed problems in the DNA ensemble model 195.

The machine learning engine 120 the context of modeling by machine learning (ML), overfitting refers to an issue of modeling that models training data too well, by learning details and noises in the training data to the extent that such details and noises negatively impact the performance of the model on new input data when applied. In order to resolve overfitting for an ML model, the training data is to be regularized such that the noises and random fluctuations in the training data would not be modeled into the ML model.

The DNA machine learning engine 120 includes a beta value encoding process 130, a DNA ensemble modeling process 140, a random number generator 150, and one or more regularization process 160.

The beta value encoding process 130 encodes a regularization equation, including bias values, into a DNA strand. In this specification, terms "beta value", "beta magnitude", "bias", and "bias values" are used interchangeably. Detailed operations of the beta value encoding process 130 in relation with other processes 140, 150, and 160 are presented in FIGS. 2 and 3, and corresponding descriptions. In this specification, terms "DNA strand" and "DNA sequence" are used interchangeably to indicate a series of monomer units called nucleotides, which is one half of a double-helix structure of a DNA molecule that has two DNA strands. Each nucleotides includes one of four (4) nucleobases of cytosine (C), guanine (G), adenine (A), or thymine (T). DNA computing utilizes the characteristics that, because A always pairs with T, and C always pairs with G, one DNA strand is a complementary image of the other DNA strand in the same DNA molecule.

The DNA ensemble modeling process 140 generates the DNA ensemble model 195 based on beta values encoded by the beta value encoding process 130 and the training data 105 as being regularized by the one or more regularization process 160. Detailed operations of the DNA ensemble modeling process 140 in relation with other processes 130, 150, and 160 are presented in FIG. 2 and corresponding description. Detailed operations of the DNA ensemble modeling process 140 are presented in FIG. 4 and corresponding description.

The one or more regularization process 160 adds a regularization term, referred to as lambda in FIG. 5, for respective instances of the training data 105 in order to make the machine learning model more generally applicable by resolving overfitting. Detailed operations of the one or more regularization process 160 in relation with other processes 130, 140, and 150 are presented in FIGS. 2 and 3, and corresponding descriptions.

In certain embodiments of the present invention, the one or more regularization process 160 is implemented as two (2) regularization processes respectively utilizing the Least Absolute Shrinkage and Selection Operator (LASSO, or L1) regularization method and the Ridge Regression (RR or L2) regularization method. Both LASSO (L1) regularization and Ridge Regression (L2) regularization add a respective regularization term to a modeling equation in order to prevent the coefficients from overfitting to the training data 105. The regularization term for LASSO (L1) regularization is the sum of weights, while the regularization term for the Ridge Regression (L2) regularization is the sum of the square of the weights. Examples of respective equations for both L1 and L2 regularizations are presented in FIG. 5 and corresponding description.

The DNA machine learning engine 120 is coupled to a DNA computer 170 for the purpose of parallel processing. In one embodiment of the present invention, the DNA computer 170 has various components including, but not limited to, a polymerase chain reaction (PCR) component, a gel electrophoresis component, a DNA encoder, and a DNA decoder. An example of the DNA computer 170 is presented in FIG. 6 and corresponding description. The DNA machine learning engine 120 is also coupled to a digital computer 180 for the purpose of conventional data and/or user interfaces.

In certain embodiments of the present invention, the DNA machine learning engine 120 is a hybrid process utilizing both the DNA computer 170 and the digital computer 180. In the same embodiment, the DNA machine learning engine 120 utilizes the digital computer 180 in order to interface with conventional data processing infrastructure based on digital technology, while utilizes the DNA computer 170 in order to achieve high parallelism and high speed operations with processing digital data encoded as DNA strands.

The system 100 is to extend the principles of regularization into DNA Machine Learning, indicating a machine learning employing multiple types of regularization in parallel as offered by DNA computing. The system 100 produces the DNA ensemble model 195 that makes accurate predictions as being benefitted from the various types of regularization. The system 100 exponentially increases the number of combinations of candidate models for the DNA ensemble model 195, by utilizing regularized as well as non-regularized training data for the DNA machine learning. Because the system 100 determines the best fit combination of the candidate models as the DNA ensemble model 195, the system 100 significantly improves accuracy in prediction based on machine learning by expanding the number of combinations.

Figure 2:
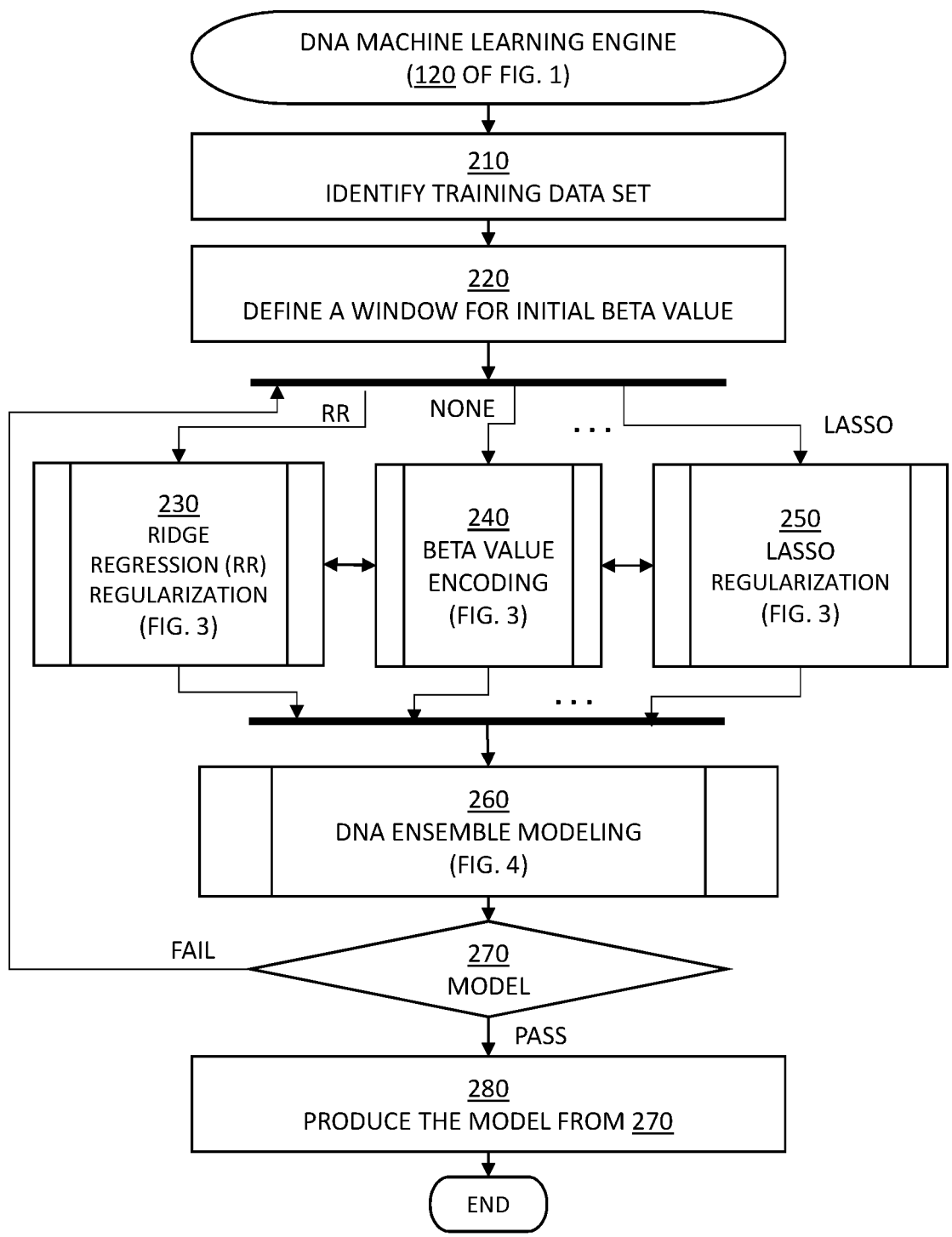
FIG. 2 depicts a flowchart of operations performed by the DNA machine learning engine of the system, in accordance with one or more embodiments set forth herein.

FIG. 2 depicts a flowchart of operations performed by the DNA machine learning engine 120 of FIG. 1, in accordance with one or more embodiments set forth herein.

In block 210, the DNA machine learning engine 120 identifies a set of the training data 105 to train the DNA ensemble model 195. Then the DNA machine learning engine 120 proceeds with block 220.

In one embodiment of the present invention, the DNA machine learning engine 120 utilizes a simple linear regression equation EQ LR of FIG. 5 in formulating an output function $f(x)$ as a sum of an initial bias ($\beta_0$), and a product of respective biases and training data instances ($\beta_j x_j$) for n number of training data instances, where $1 \leq j \leq n$ $$f(x)=\beta_0+\beta_1 x_1+ \ldots +\beta_n x_n$$

In block 220, the DNA machine learning engine 120 selects initial beta values ($\beta_0 \ldots \beta_n$) and defines a window around each initial beta value ($\beta_{mn}$). Then the DNA machine learning engine 120 proceeds with block 230.

The beta value indicates a bias of the machine learning model, as noted. Embodiments of the present invention recognizes that, in statistics and machine learning, high bias, or too large a window around a bias, can cause the machine learning model to miss relevant relations between features of inputs and target outputs, which is an opposite type of error to overfitting. Accordingly, regularizing the training data to resolve the overfitting issue is to be balanced with the respective windows for the beta values, commonly known as the bias—variance tradeoff.

In one embodiment of the present invention, the DNA machine learning engine 120 selects respective beta values by generating a random number by use of a random number generator 150 and then scaling the generated random number to a predetermined range. The window around each beta value represents a range in which each beta value is to be set, as the beta values are not a fixed number.

In expectation equation EQ EXP of FIG. 5, term $E(Y|\overline{x}_t)$ indicates a conditional expectation of (Y) as a function of variable ($\overline{x}_t$), where term $\beta_{0j}$ is the initial bias value, and term $\beta_{mn}x_t$ indicates a product of bias value at a window mn ($\beta_{mn}$) and an instance of the training data 105 ($x_t$). Each training data instance ($x_t$) is also referred to as a feature vector.

For example, the linear regression equation is $$f(x)=\beta_0+\beta_1 x_1+\beta_2 x_2$$

where n=2 from EQ LR of FIG. 5. The DNA machine learning engine 120 randomly selects the initial beta values, $\beta_0$, $\beta_1$, and $\beta_2$, and scales down by the same formula with constants a, c, d, and e. The DNA machine learning engine 120 also defines a window of 6 for a first beta value ($\beta_0$), 3 for a second beta value ($\beta_1$), and 5 for a third beta value ($\beta_2$)

$$\beta_0 = 1 + \frac{(rand()(-d)*(c-a)}{(e-d)}$$

$$\beta_1 = 1 + \frac{(rand()(-d)*(c-a)}{(e-d)}$$

$$\beta_2 = 1 + \frac{(rand()(-d)*(c-a)}{(e-d)}$$

The result produces windows for respective beta values
$\beta_0$: $\beta_{01}$=30, $\beta_{02}$=42
$\beta_1$: $\beta_{11}$=12, $\beta_{12}$=18
$\beta_2$: $\beta_{21}$=28, $\beta_{22}$=38 where two data points $\beta_{01}$ and $\beta_{02}$ indicate a range for the first beta value ($\beta_0$), which is a twice the size of the window of 6 for the first beta value. The second and the third beta values are represented with respective ranges with two data points.

Equations EQ1 through EQ8 below show the probability of a beta value given a feature vector ($x_1$) from the training data 105. In the equations EQ1 through EQ8, only the first beta value ($\beta_0$) is shown because other beta values and corresponding linear combination may be formulated similarly to the case of the first beta value ($\beta_0$). The DNA machine learning engine 120 explores the equations EQ1 through EQ8 for options to maximize the probability over a predetermined number of tries.

$$E(Y|\overline{x}_t)=\beta_{01}+\beta_{11}x_1 \quad (EQ1)$$

$$E(Y|\overline{x}_t)=\beta_{02}\beta_{11}x_1 \quad (EQ2)$$

$$E(Y|\overline{x}_t)=\beta_{01}+\beta_{12}x_1 \quad (EQ3)$$

$$E(Y|\overline{x}_t)=\beta_{02}+\beta_{12}x_1 \quad (EQ4)$$

$$E(Y|\overline{x}_t)=\beta_{01}+\beta_{21}x_1 \quad (EQ5)$$

$$E(Y|\overline{x}_t)=\beta_{02}+\beta_{21}x_1 \quad (EQ6)$$

$$E(Y|\overline{x}_t)=\beta_{01}+\beta_{22}x_1 \quad (EQ7)$$

$$E(Y|\overline{x}_t)=\beta_{02}+\beta_{22}x_1 \quad (EQ8)$$

The DNA machine learning engine 120 performs blocks 230, 240 and 250 in parallel by use of the DNA computer 170. In certain embodiments of the present invention, regularization methods other than RR and LASSO are optionally configured and run in parallel along with blocks 230, 240, and 250. As blocks 230, 240, and 250 run in parallel, numerous threads of respective blocks would interact with one another. Detailed operations of blocks 230, 240, and 250 are presented in FIG. 3 and corresponding description.

In block 230, the DNA machine learning engine 120 regularizes the training data set from block 210 by Ridge Regression (RR, or L2) regularization, as operating in conjunction with the beta value encoding process of block 240. Then the DNA machine learning engine 120 proceeds with block 260.

In one thread of block 240, the DNA machine learning engine 120 encodes beta values and regularization metrics from the RR regularization process of block 230 into a corresponding DNA strand, then returns a concatenated DNA strand to the RR regularization process for further processing. In another thread of block 240, the DNA machine learning engine 120 encodes beta values and regularization metrics from the LASSO regularization process of block 250 into a corresponding DNA strand, then returns a concatenated DNA strand to the LASSO regularization process for further processing.

In block 250, similar to block 230, the DNA machine learning engine 120 regularizes the training data set from block 210 by the Least Absolute Shrinkage and Selection Operator (LASSO, or L1) regularization, as operating in conjunction with the beta value encoding process of block 240. Then the DNA machine learning engine 120 proceeds with block 260.

In block 260, the DNA machine learning engine 120 generates an ensemble model based on DNA strand groups based on the results from blocks 230, 240, or 250. Then the DNA machine learning engine 120 proceeds with block 270. Detailed operations of block 260 are presented in FIG. 4 and corresponding description.

In block 270, the DNA machine learning engine 120 determines whether or not the ensemble model produced from block 260 satisfies a preconfigured condition for the DNA ensemble model 195. If the DNA machine learning engine 120 determines that the ensemble model from block 260 satisfies the preconfigured condition for the DNA ensemble model 195, then the DNA machine learning engine 120 proceeds with block 280. If the DNA machine learning engine 120 determines that the ensemble model from block 260 does not satisfy the preconfigured condition for the DNA ensemble model 195, then the DNA machine learning engine 120 loops back to the parallel unit of processes in blocks 230, 240, and 250.

In certain embodiments of the present invention, the preconfigured condition for the DNA ensemble model 195 would be a preconfigured accuracy for prediction made by the ensemble, as the ensemble predicts a certain outcome during an event is progressing, based on historical data as well as real time data feeds of the event or the like.

In block 280, the DNA machine learning engine 120 produces the ensemble from block 270 as the DNA ensemble model 195, because the preconfigured condition for the DNA ensemble model 195 has been met by the ensemble model. Where more than one ensemble passes the test of block 270, the DNA machine learning engine 120 produces the best fit ensemble as the DNA ensemble model 195, such that the DNA ensemble model 195 predicts, with a certain accuracy, targeted outcomes based on inputs distinctive from the training data set. Then the DNA machine learning engine 120 terminates processing the training data set identified from block 210.

Figure 3:
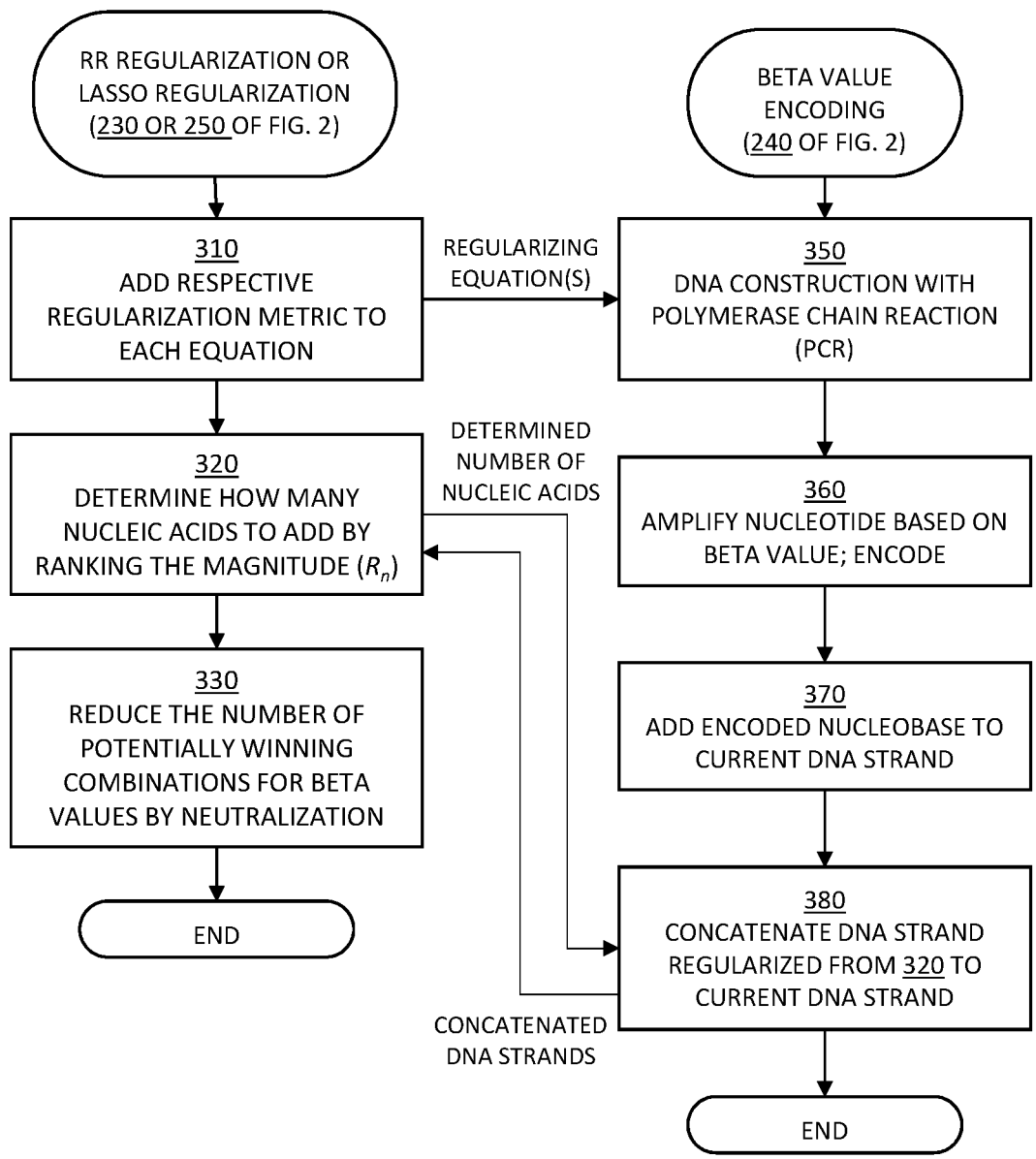
FIG. 3 depicts flowcharts of respective operations performed by the regularization processes and the beta encoding process of the system, in accordance with one or more embodiments set forth herein.

FIG. 3 depicts flowcharts of respective operations performed by the regularization processes 230, 250, and the beta encoding process 240 of FIG. 2, in accordance with one or more embodiments set forth herein.

Blocks 310, 320, and 330 are performed as a unit for regularization in place of either block 230 or block 250, in each thread. The RR regularization in block 230 of FIG. 2 and the LASSO regularization in block 250 of FIG. 2 have respective threads of execution by the DNA computer 170 for blocks 310, 320, and 330. Each regularization thread would interact with the beta value encoding process 240 of FIG. 2, of which details are presented in blocks 350, 360, 370, and 380.

In block 310, the RR regularization process 230 or the LASSO regularization process 250 adds a regularization metric (R'($\bar{\beta}$)) to each equation formulating a conditional expectation value presented in EQ EXP of FIG. 5, E(Y|$\bar{x}_t$)=$\beta_{0j}$+$\beta_{mn}x_t$.

As a result, the RR regularization process 230 or the LASSO regularization process 250 produces a regularized conditional expectation value in EQ REG of FIG. 5, $$E(Y|\bar{x}_t) = \beta_{0j} + \beta_{mn}x_t + R'(\bar{\beta})$$

which is made available for the beta value encoding process 240 in block 350, by use of data transfer, recording on a shared memory space, and any other method conventionally available with the digital computer 180. Then the RR regularization process 230 or the LASSO regularization process 250 proceeds with block 320.

Similar to the expectation equation EQ EXP, in the regularized expectation equation EQ REG of FIG. 5, term E(Y|$\bar{x}_t$) indicates a conditional expectation of Y as a function of variable ($\bar{x}_t$), where term $\beta_{0j}$ is the initial bias value, term $\beta_{mn}x_t$ indicates a product of bias value at a window mn ($\beta_{mn}$) and an instance of the training data 105 ($x_t$), and term (R'($\bar{\beta}$)) is a regularization metric respective to either the RR regularization process 230 or the LASSO regularization process 250. Y is one of the ensembles in the DNA ensemble model 195.

The regularization metric (R'($\bar{\beta}$)) is represented in EQ RT of FIG. 5, as a sum of RSS and $R_n$, where RSS is the Residual Sum of Squares, and $R_n$ is a rank of regularization magnitude, or simply the magnitude $$R'(\bar{\beta}) = RSS + R_n$$

$$\text{where } RSS = \sum_{i=1}^{n}\left(y_i - \beta_0 - \sum_{j=1}^{p}\beta_0 x_{ij}\right)^2, R_n = \lambda\sum_{j=1}^{p}R(\beta_i)$$

In the terms of RSS, $y_i$ is the label representing each ensemble in the DNA ensemble model 195, $x_{ij}$ is the feature vector representing each instance in the training data 105, and $\beta_0$ is the initial beta value. In the terms of $R_n$, parameter $\lambda$ is a predetermined regularizer indicating the range of tolerance for bias, ordinarily in the range [0.01, 10], and $R(\beta_i)$ is the regularization term set forth by a regularization method. Also shown in EQ RR of FIG. 5, the regularization term for the Ridge Regression (RR) regularization 230 is the sum of the square of the weights, $R(\beta_j) = \beta_j^2$. Accordingly, the regularization metric (R'($\bar{\beta}$)) in the RR regularization 230 is formulated as:

$$R'(\bar{\beta}) = RSS + \lambda\sum_{j=1}^{p}\beta_j^2$$

As shown in EQ LASSO of FIG. 5, the regularization term for LASSO regularization process 250 is the sum of weights, $R(\beta_j) = |\beta_j|$. Accordingly, the regularization metric (R'($\bar{\beta}$)) in the LASSO regularization 250 is formulated as:

$$R'(\bar{\beta}) = RSS + \lambda\sum_{j=1}^{p}|\beta_j|$$

Embodiments of the present invention recognizes that a method of least squares is traditionally used to estimate the beta values where the RSS is minimized. The regularization magnitude $R_n$ is added to the minimized RSS in order to avoid overfitting of class imbalances and to perform feature selection by penalizing very large beta values.

In block 320, the RR regularization process 230 or the LASSO regularization process 250 determines how many nucleic acids to add by ranking the regularization magnitude $R_n$. The respective regularization process, 230 or 250, makes the determined number indicating the nucleic acids available for the beta value encoding process 240 in block 380. The RR regularization process 230 or the LASSO regularization process 250 subsequently receives concatenated DNA strands from block 380 of the beta value encoding process 240 in response. Then the RR regularization process 230 or the LASSO regularization process 250 proceeds with block 330.

In block 330, the RR regularization process 230 or the LASSO regularization process 250 reduces the number of potentially winning combinations for the beta values by neutralizing, at the hydrogen bonding site, the DNA strands received from block 380 of the beta encoding process 240.

Each DNA strand that has been neutralized results in impaired movement within liquid, which causes less DNA strands to bond to other preexisting DNA strands corresponding to solutions. The less DNA strands bonding to the solutions would reduce the number of potentially winning solutions for beta values. When the DNA strands that encode $E(Y|\overline{x}_t)=\beta_{0j}+\beta_{mn}x_1+R'(\overline{\beta})$, EQ REG of FIG. 5, are retrieved, the relative number of each subsequent solution acts as a weight when joining all beta values together. At the conclusion of block 330, the RR regularization process 230 or the LASSO regularization process 250, completes encoding $E(Y|\overline{x}_t)=\beta_{0j}+\beta_{mn}x_1+R'(\overline{\beta})$, EQ REG of FIG. 5, in a form of DNA.

As noted in block 310, respective regularization processes affect how the nucleic acids neutralized at the hydrogen bonding site are to be chained together, as represented in the respective regularization metrics. The RR regularization process 230 utilizes squared ranks in order to determine the number of nucleic acids to neutralize. The LASSO regularization process 250 utilizes respective ranks. In any other regularization method using absolute values, the rank is taken to determine the number of nucleic acids to neutralize.

As noted above, multiple threads of the beta value encoding process 240 respectively interact with other regularization threads, either the RR regularization process 230 or the LASSO regularization process 250.

In block 350, the beta value encoding process 240 builds a plurality of DNA strands corresponding to the regularization equation received from block 310, or corresponding to a non-regularized equation directly from block 220. As noted, block 310 is a part of a thread performing either the RR regularization process 230 or the LASSO regularization process 250, as a unit. In one embodiment of the present invention, the beta value encoding process 240 utilizes Polymerase Chain Reaction (PCR) in replicating the DNA strands for parallel processing. Then the beta value encoding process 240 proceeds with block 360.

In block 360, the beta value encoding process 240 amplifies nucleotides based on respective magnitudes of beta values within the window defined in block 220, and subsequently encodes amplified nucleotides at a nucleobase level. Embodiments of the present invention recognizes that nucleotides are building blocks of a DNA strand. Then the beta value encoding process 240 proceeds with block 370.

In block 370, the beta value encoding process 240 adds an encoded nucleobase from block 360 to a current DNA strand built in block 350. Then the beta value encoding process 240 proceeds with block 380.

In block 380, the beta value encoding process 240 concatenates the DNA strand regularized from block 320 to the current DNA strand, and makes the concatenated DNA strand available for block 320 of either the RR regularization process 230 or the LASSO regularization process 250. Alternatively, the beta value encoding process 240 produces the current DNA strand, where the current DNA stand built in block 350 corresponds to the non-regularized equation. Then the beta value encoding process 240 terminates encoding the current DNA strand built from block 350.

Figure 4:
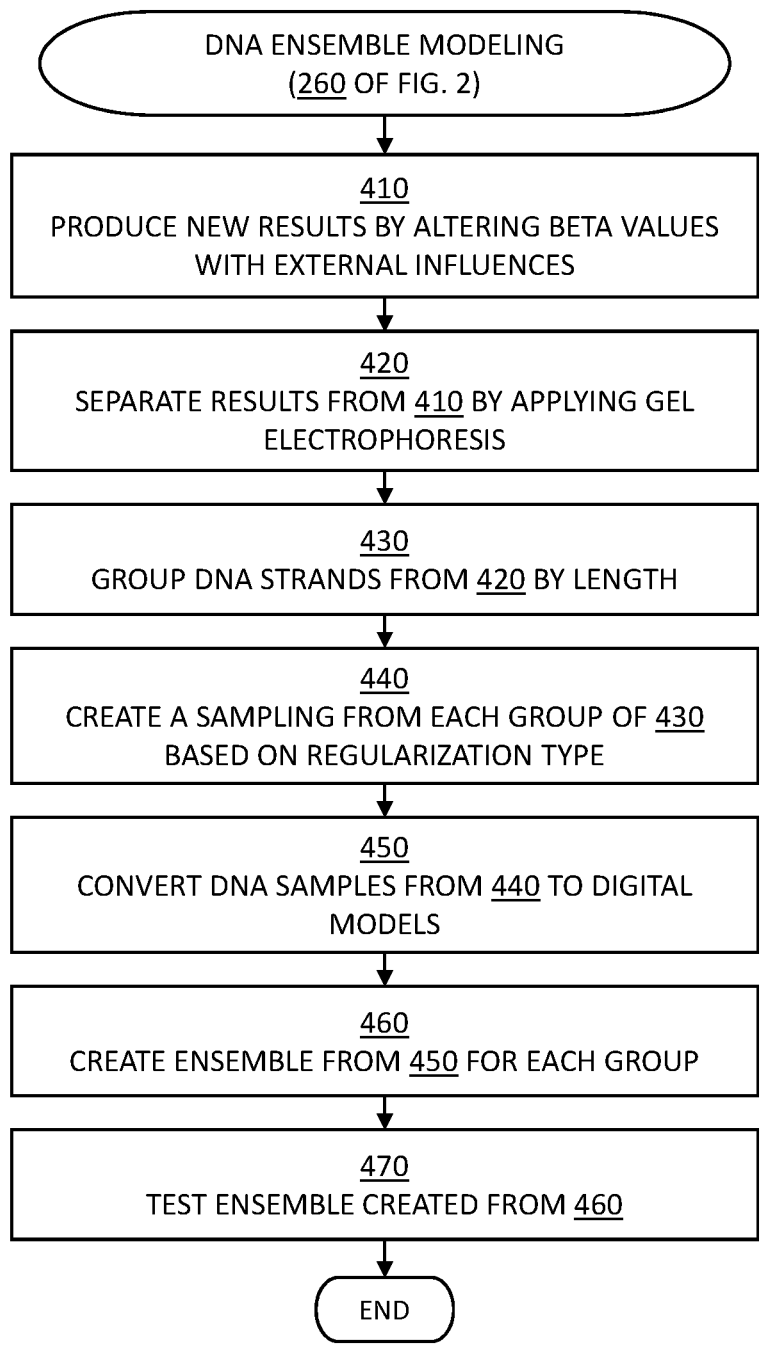
FIG. 4 depicts a flowchart of operations performed by the DNA ensemble modeling process of the system, in accordance with one or more embodiments set forth herein.

FIG. 4 depicts a flowchart of operations performed by the DNA ensemble modeling process 260 of FIG. 2, in accordance with one or more embodiments set forth herein.

In block 410, the DNA ensemble modeling process 260 produces new results from the result of block 330 of the regularization processes 230, 250, by altering beta values with external influences such as heat and/or pressure. By increasing beta values, the DNA ensemble modeling process 260 decrease the weight corresponding to an external influence to the conditional expectation. By decreasing the beta value, the weight of an external influence in the conditional expectation would be increased and the relationship between the external influence and the target outcome would be more closely modeled. Then the DNA ensemble modeling process 260 proceeds with block 420.

In block 420, the DNA ensemble modeling process 260 separates the new results produced from block 410 by applying gel electrophoresis to the new results. Then the DNA ensemble modeling process 260 proceeds with block 430.

Gel electrophoresis is a method for separation and analysis of macromolecules such as DNA and/or ribonucleic acid (RNA) and fragments thereof, based on size and charge of the macromolecules being analyzed. It is established that, in biochemistry and molecular biology, gel electrophoresis is used to separate a mixed population of DNA/RNA fragments by length, to estimate the size of DNA/RNA fragments or to separate proteins by charge.

In block 430, the DNA ensemble modeling process 260 separate DNA strands resulting from block 420 into a predefined number of groups by length. The length, or size, of a DNA strand indicates respective beta values that has been encoded and altered. Then the DNA ensemble modeling process 260 proceeds with block 440.

In block 440, the DNA ensemble modeling process 260 creates a sampling from each group of block 430, based on regularization types. Accordingly, in the embodiments where the RR regularization process 230 and the LASSO regularization process 250 are employed, the DNA ensemble modeling process 260 creates numerous samples by lengths distinctively for one group of DNA stands regularized by the RR regularization process 230 and for another group of DNA strands regularized by the LASSO regularization process 250. Then the DNA ensemble modeling process 260 proceeds with block 450.

In block 450, the DNA ensemble modeling process 260 converts the DNA samples, per length, per regularization method, as sampled from block 440, into digital models. The conversion of a DNA strand into digital data form is also referred to as DNA decoding, or simply a decoding. Then the DNA ensemble modeling process 260 proceeds with block 460.

In block 460, the DNA ensemble modeling process 260 creates one or more DNA ensemble from the digital models respective to each length-regularization group. Then the DNA ensemble modeling process 260 proceeds with block 470.

In certain embodiments of the present invention, the DNA ensemble modeling process 260 may use DNA inputs that are not regularized, as well as respectively regularized DNA inputs. In the same embodiment of the present invention, the DNA ensemble modeling process 260 creates the DNA ensemble including three (3) combinations respectively from samples that had not been regularized, from another samples that had been regularized by RR, and from still another samples that had been regularized by LASSO. Accordingly, the DNA ensemble modeling process 260 produces nine (9) potential combinations based on regularized inputs, and then by adding the non-regularized encoded nucleobase to the regularized encoded DNA stand, as in block 370 of FIG. 3, the DNA ensemble modeling process 260 produces twenty-seven (27) candidate combinations from which the best fit for the DNA ensemble model 195 to be determined. The number of candidate combinations are calculated as (n!/(k!(n−k)!)), where n indicates the number of elements and k indicates the number of elements to select together.

In block 470, the DNA ensemble modeling process 260 tests the one or more DNA ensemble created from block 460, according to a preconfigured standard, such as a certain percentage of accuracy in predictions based on the DNA ensemble. Then the DNA ensemble modeling process 260 proceeds with block 270 of FIG. 2.

According to operations presented in FIGS. 2-4, in one embodiment of the present invention, the DNA machine learning engine 120 produces a DNA ensemble model for predicting the outcome of a tennis match at any time during play. The input data may include initial historical data, real time data feeds, and social data. The initial historical data include, but are not limited to, current records of respective players, current official rankings of the respective players, previous match results between the players, weather conditions for each of previous matches including temperature, humidity, records for each tournament location/country including Australia, France, the United States, and record per court type including hard, clay, grass. The real time data feeds include, but are not limited to, current set score, current game score, the number of unforced errors, and the first serve percentages. The social data include, but are not limited to, popularity in respective social networks, search ranking/hits for respective players.

Each instances of respective data items are independent variables that are to be selected as initial beta values in block 220 of FIG. 2 in the process of producing the DNA ensemble model for predicting the outcome of a tennis match. The DNA machine learning engine 120 uses two (2) distinct types of regularization in order to penalize weights that are not applicable to the current match. For example, the DNA machine learning engine 120 would not weigh records of a player for matches on clay courts as much as records on grass courts if the current match is on a grass court.

The DNA machine learning engine 120 initially obtains a training data set for training a set of models in block 210 of FIG. 1, according to the aforementioned purpose of the models. The DNA machine learning engine 120 initiates each model of the set of models for every data item from the aforementioned examples. The DNA machine learning engine 120 starts two types of regularizations, RR and LASSO, blocks 230 and 250, respectively, while sharing the same construct based on linear regression and a regularization metric for converting each model into DNA strands in block 240. The DNA machine learning engine 120 amplifies the penalty of the regularization terms through PCR in the beta value encoding process 240. In block 260, the DNA machine learning engine 120 adds external factors to alter how concatenated regularized DNA strand affects the model in block 410, sorts the DNA strands based on strand lengths, through gel electrophoresis, in blocks 420 and 430, decodes DNA strands into digital models in block 450, and then creates multiple ensemble models in block 460. The DNA machine learning engine 120 tests each ensemble model with a test data set. If the ensemble model does not meet a certain criteria, the DNA machine learning engine 120 repeats, as a unit, encoding and regularization, followed by altering and creating the ensemble.

The ensemble model is for predicting score of the current tennis match during any point of the play using historical data as well as real time data feeds.

FIG. 5 depicts equations utilized in the regularization processes 230, 250 and the beta encoding process 240, in accordance with one or more embodiments set forth herein.

Equation EQ LR is a generalized form of linear regression equation. Details of Equation EQ LR in the context of the DNA machine learning engine 120 are presented in description for blocks 210 and 220 of FIG. 3.

Equation EQ EXP is an expectation equation conditional to feature vectors. Details of Equation EQ EXP in the context of the DNA machine learning engine 120 are presented in description for blocks 220 of FIG. 2 and 310 of FIG. 3.

Equation EQ REG is a regularized conditional expectation equation having a regularization metric. Details of Equation EQ EXP in the context of the DNA machine learning engine 120 are presented in description for blocks 310 and 330 of FIG. 3.

Equation EQ RT is the regularization metric of the regularized expectation equation. Details of Equation EQ RT in the context of the DNA machine learning engine 120 are presented in description for block 310 of FIG. 3.

Equation EQ RR is a regularization term for the Ridge Regression (RR) regularization process 230. Details of Equation EQ RR in the context of the DNA machine learning engine 120 are presented in description for block 310 of FIG. 3.

Equation EQ LASSO is a regularization term for the Least Absolute Shrinkage and Selection Operator (LASSO) regularization process 250. Details of Equation EQ LASSO in the context of the DNA machine learning engine 120 are presented in description for block 310 of FIG. 3.

Certain embodiments of the present invention may offer various technical computing advantages, including expanding the number of combinations for candidate models to produce a machine learning model, and consequently, improving accuracy of predictions made by the machine learning model. Certain embodiments of the present invention regularize training data with various preselected method in parallel by utilizing DNA computing. Certain embodiments of the present invention exponentially increases the number of combinations for the candidate models for the machine learning model by utilizing, in parallel by use of a DNA computer, both non-regularized training data and the regularized training data. Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscribed scheduling service. Accordingly, the scheduling service for collaboration in a group may be provided for any type of entities in need from any location in the world.

Figure 6:
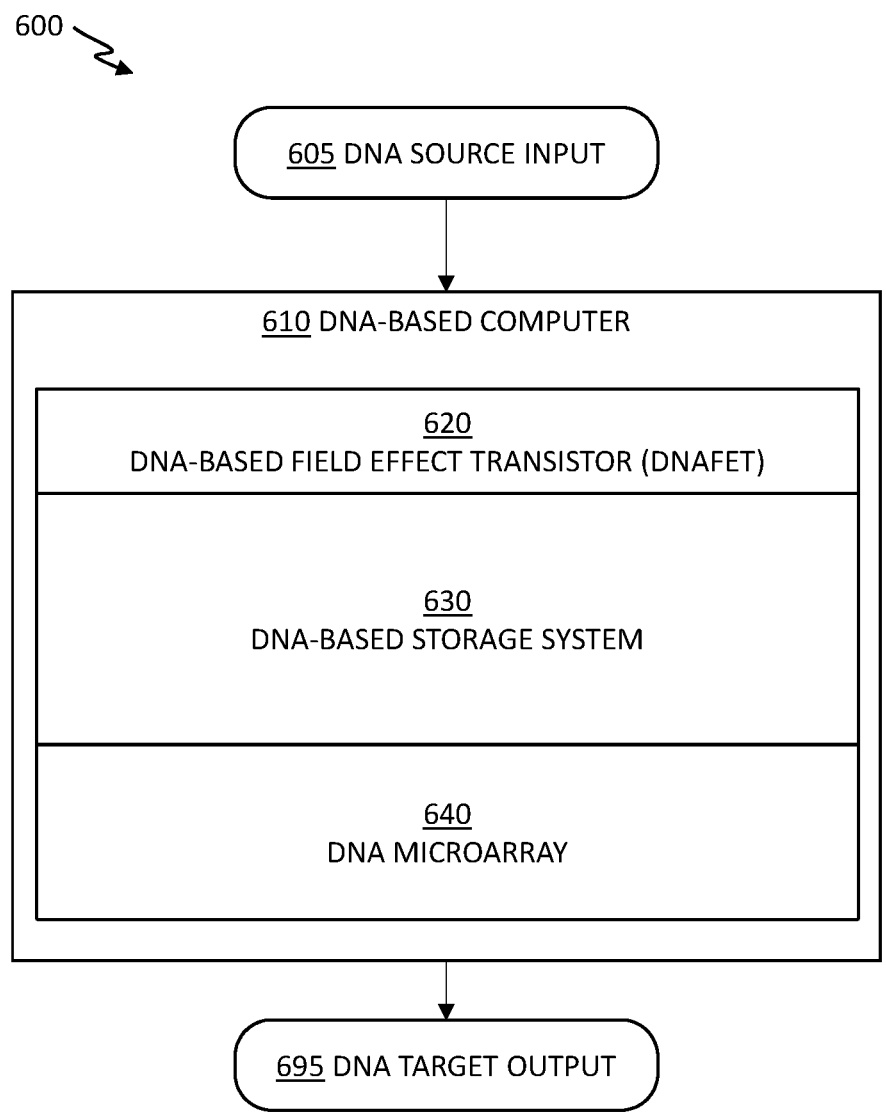
FIG. 6 depicts a DNA-based computing system according to one or more embodiments of the present invention.

FIG. 6 depicts a DNA-based computing system 600 according to one or more embodiments of the present invention.

As noted, embodiments of the present invention recognizes that an established computation phases of DNA computing includes: 1) formation of parameter trees for a problem by using DNA-based source input 605; 2) encoding of the problem into a specific DNA sequence; 3) hybridizing between various DNA sequences by utilizing a preselected hybridization methodology from a DNA pool including a design pool and a methodology pool and recombining thereof; 4) DNA mutation involving extraction of certain desired DNA sequences; 5) graphically decoding the extracted DNA sequences back to the parameter-problem context; and 6) code optimization attempting to improve the time and space requirements of a DNA computing program in the DNA pool. At the conclusion of the aforementioned computation phases, a DNA target output 695 is produced.

Embodiments of the present invention also recognizes that the DAN target output 695 is converted into computable digital output in hybrid computing systems utilizing both DNA computing and conventional digital computing.

The entire DNA strand for a DNA-based computer 610 is split into 2 parts: active component and passive component.

The active component participates in the hybridization (Phase 3). This component represents the architectural details as well as the Instruction Set details. The active component is created in the encoding stage (Phase 2) and expanded in the hybridization stage (Phase 3), indicating that the basic architectural details are added to the DNA string in the encoding stage while finer aspects are added to the DNA string during recombination stage (Phase 3). Examples of basic architectural details include, but are not limited to, 128 bit instruction length. Examples of the finer aspects include, but are not limited to, the usage of a Carry Save Adder (CSA).

The passive component is formed in the mutation stage (Phase 4). The passive component includes the Finite State Machine (FSM) description, the netlist and basic placement details of the DNA-based computer 610. The "netlist" defines the connectivity across various components of an electronic design while "placement" is the process of assigning exact locations to various components in the core area of the DNA-based computer 610. The active components of various DNA-based computers react with each other during the hybridization stage (Phase 3) while the passive components are formed during the mutation stage (Phase 4). The passive components do not take part actively during the hybridization stage, but the FSM details of two interacting DNA-based computers are inherited by the offspring based on the respective instruction sets. The inherited FSMs are then used as guidelines to form the actual FSM of the offspring.

The DNA-based computer 610 includes a DNA-based field-effect transistor (DNAFET) 620, a DNA-based storage system 630, and a DNA microarray 640.

The DNAFET 620 is a field-effect transistor which uses the field-effect due to the partial charges of DNA molecules to function as a biosensor. The biosensor works as an analytical device detecting an analyte. The analyte combines a biological component with a physicochemical detector. Biosensors typically include a bio-recognition component, a biotransducer component, and an electronic system including a signal amplifier, processor, and display. Transducers and the electronic system can be combined as in Complementary metal-oxide-semiconductor (CMOS)-based microsensor systems. As a transistor controls the flow of electrons along a circuit in electronics, a DNA-based transistor, referred to as a transcriptor, controls the flow of a specific protein, RNA polymerase, as the transcriptor travels along a strand of DNA, in biologics.

The DNA-based storage system 630 stores digital data in a base sequence of DNA in the DNA-based computer 610. The DNA-based storage system 630 is to be used to record data in a living cell, instead of using silicon chips as in electronics. Accordingly, the DNA-based storage system 630 enables tracking of cell divisions to study cell processes like development, ageing and the changes that occur in cancers. The DNA-based storage system 630 uses artificial DNA that had been made using commercially available oligonucleotide synthesis machines for storage and DNA sequencing machines for retrieval. A simple code that maps bits and corresponding DNA bases had been used but is known to lead to long runs of the same base, and consequently the sequencing of such long DNA bases is error-prone. The DNA-based storage system 630 implements various types of storage medium such as hard drives and magnetic tapes.

The DNA microarray 640 are small, solid supports onto which the DNA sequences from thousands of different genes are immobilized, or attached, at fixed locations. Examples of the supports include, but are not limited to, glass microscope slides, silicon chips, and nylon membranes. DNA strands that are being processed are printed, spotted, or synthesized directly onto the support. As a result, each spot in the DNA microarray 640 is to be either DNA, complementary DNA (cDNA), or oligonucleotides. With the aid of a digital computer, the amount of messenger RNA (mRNA) bound to each spot on the microarray is precisely measured, generating a profile of gene expression in the cell. The gene sequences in a microarray are attached to their support in an orderly or fixed way, in order to identify a particular gene sequence and/or gene mutation by using the spot in the DNA microarray 640. Also the DNA microarray 640 is used to determine expression level of genes in a sample, indicating how abundant the genes are in the sample, or to compare gene transcription in two or more different kinds of cells.

The DNA-based computer 610 includes a DNA pool 620 as a collection of various DNA pools having respective purposes, corresponding to respective functionalities of the DNAFET, or the processor, 620, the DNA-based storage system 630, and the DNA microarray 640. The DNA pool includes a design pool and a methodology pool, interacting with each other. The design pool is known to store complete designs respective of various processing components, as in DNAFET 620, as well as several different functional units. Architectural details, instruction set and FSM design of a microprocessor are stored as DNA sequences in the design pool. The processor strings, as in DNAFET 620, are stored in an indexed array format for ease of retrieval. Each processor, as in DNAFET 620, is associated with a potency factor, which indicates capability of the processor in producing an offspring with a specific characteristic (metrics). The methodology pool stores various heuristics used in the hybridization stage (Phase 3) and their respective effectiveness value.

Figure 7:
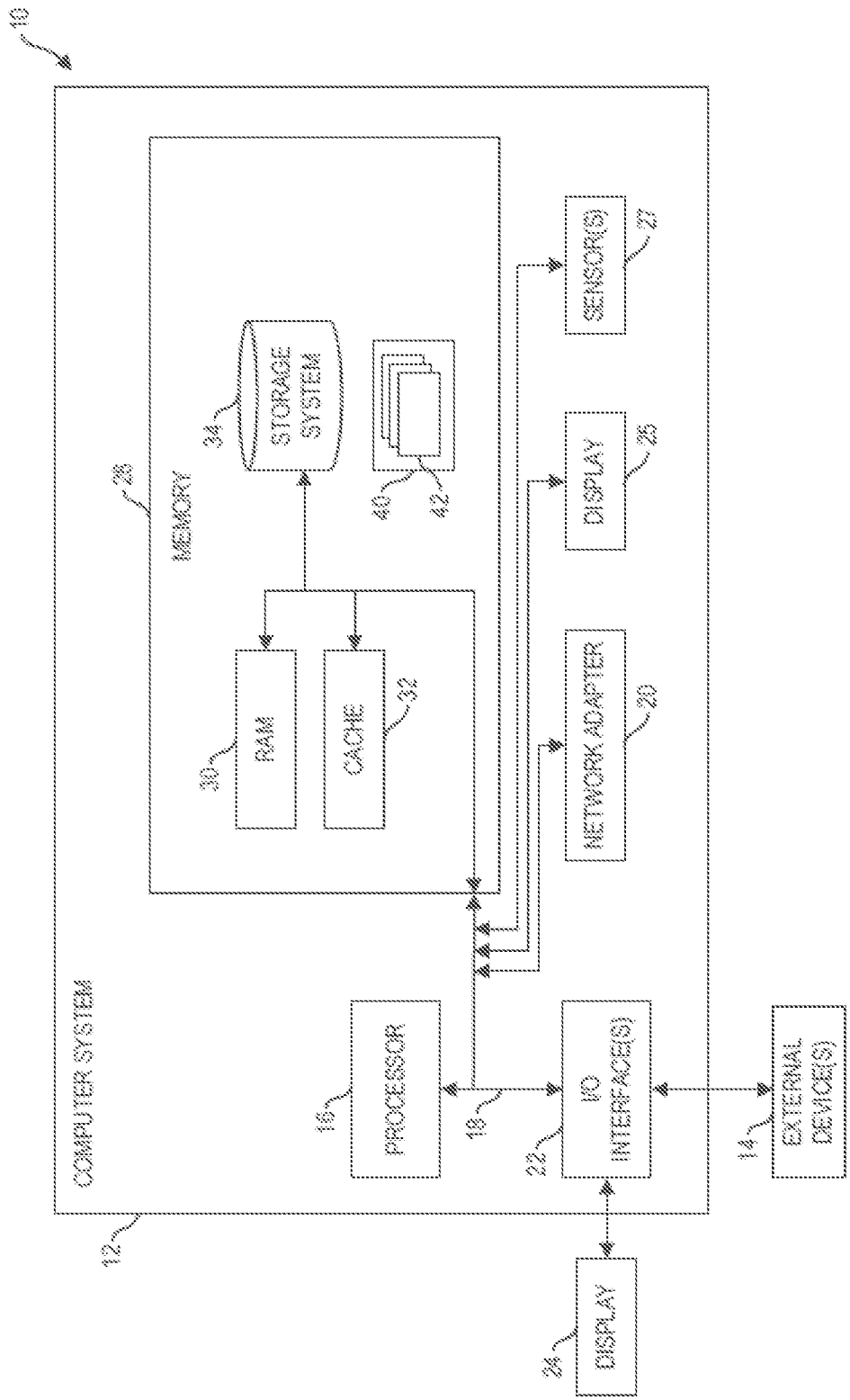
FIG. 7 depicts a cloud computing node according to one or more embodiments of the present invention.
Figure 8:
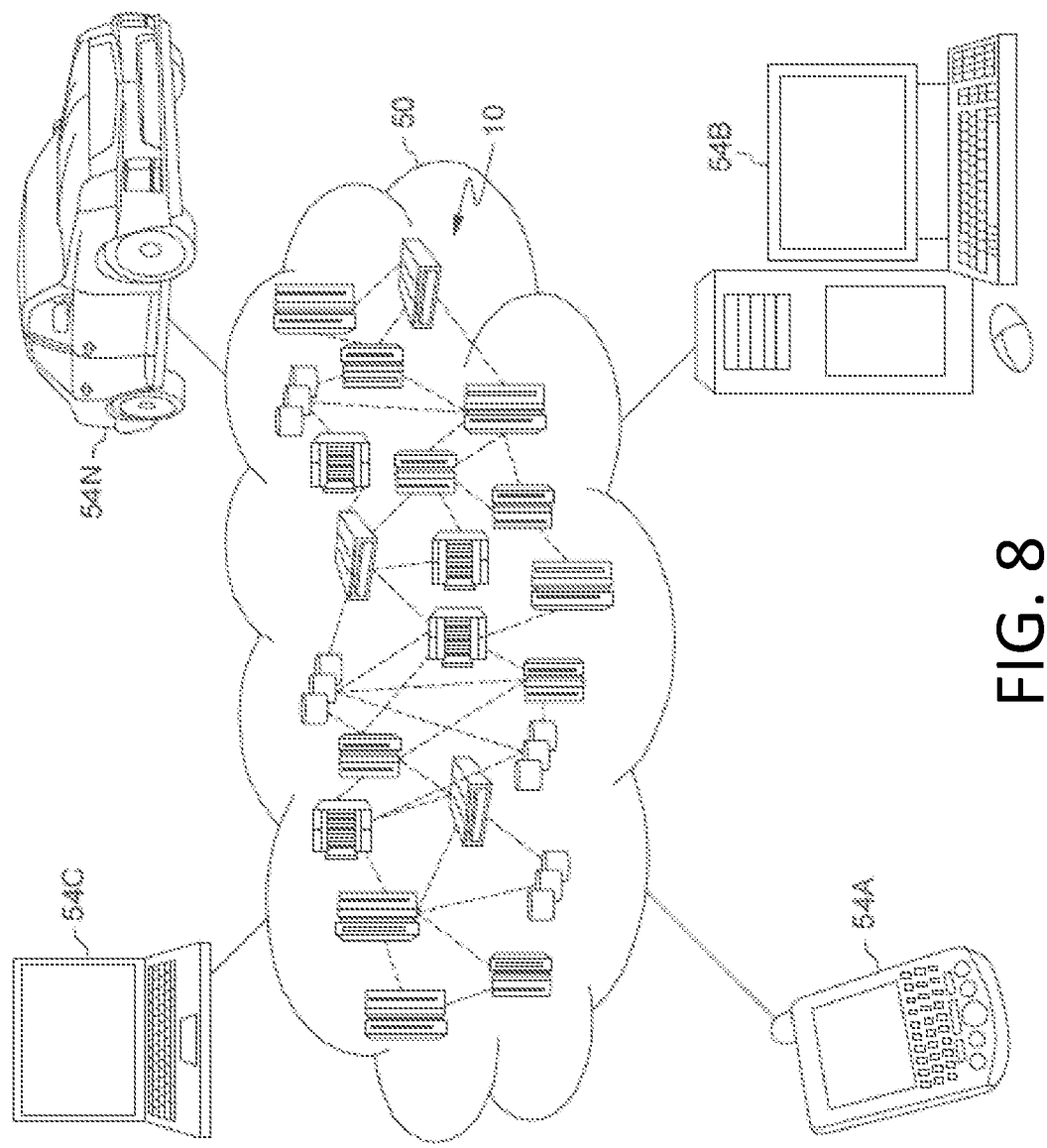
FIG. 8 depicts a cloud computing environment according to one or more embodiments of the present invention.
Figure 9:
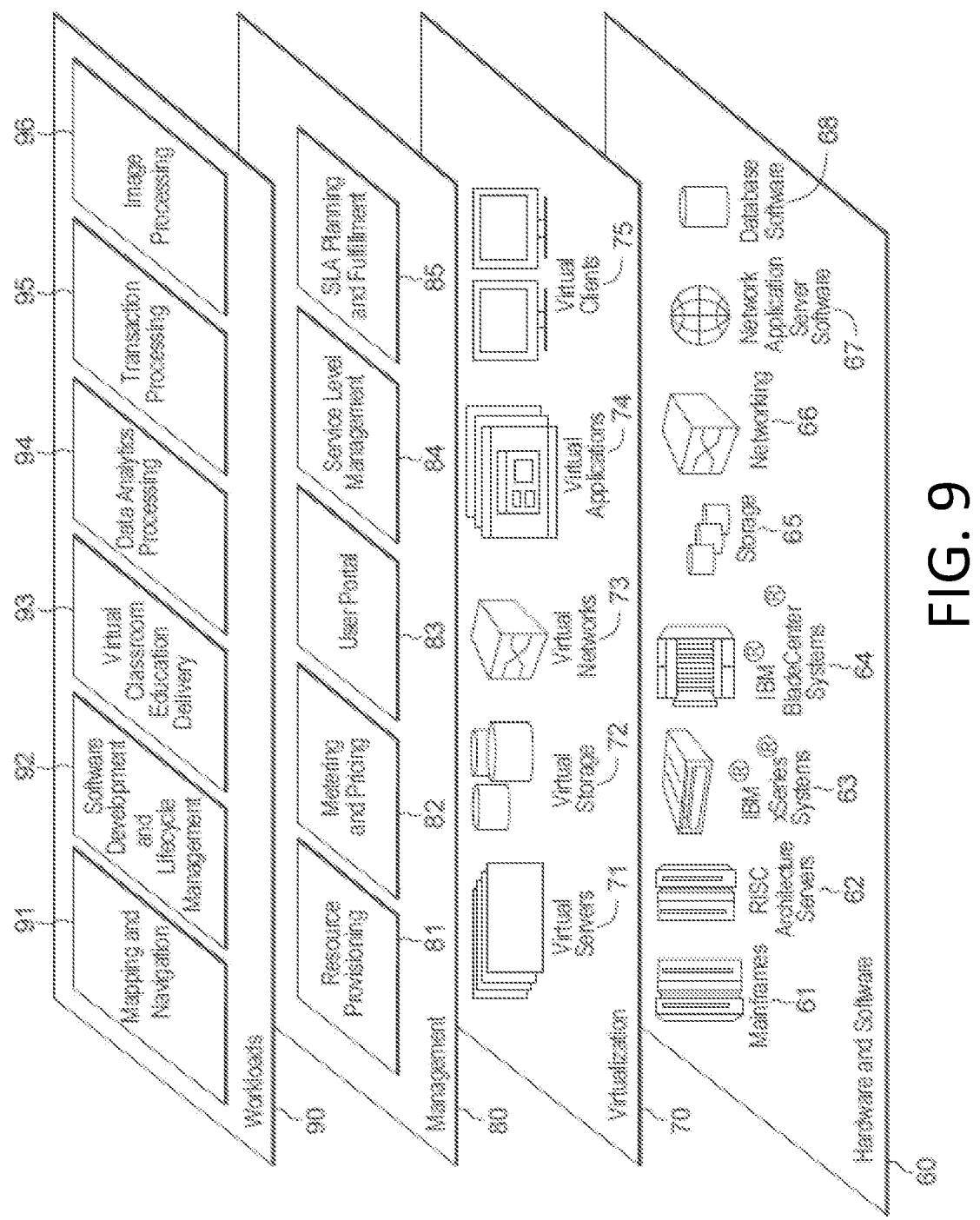
FIG. 9 depicts abstraction model layers according to one or more embodiments of the present invention.

FIGS. 7-9 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the DNA machine learning engine 120 of FIG. 1. Program processes 42, as in DNA machine learning engine 120, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the collaborative scheduling services as provided by the DNA machine learning engine 120, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises,"

"has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
   building, by one or more DNA processor, a DNA strand corresponding to a conditional expectation, the conditional expectation corresponding to a feature vector from a training data set;
   amplifying, by the one or more DNA processor, nucleotides based on beta values for the conditional expectation from the building;
   encoding, by the one or more DNA processor, the amplified nucleotide as nucleobases; and
   adding, by the one or more DNA processor, the encoded nucleobases to the DNA strand from building.

2. The computer implemented method of claim 1, further comprising:
   converting, by two or more processors, the DNA strand from the adding to a digital model.

3. The computer implemented method of claim 1, further comprising:
   converting, by two or more processors, the DNA strand from the adding to a digital model;
   wherein the two or more processors include one or more digital processor and one or more DNA processor.

4. The computer implemented method of claim 1,
   wherein the two or more processors include one or more digital processor and one or more DNA processor.

5. The computer implemented method of claim 1, further comprising:
   creating a plurality of ensembles of digital models including the digital model from the converting; and
   producing a best fit ensemble amongst the created ensembles as the machine learning model.

6. The computer implemented method of claim 1, further comprising:
   producing a best fit ensemble amongst created ensembles as the machine learning model, wherein the machine learning model predicts targeted outcomes based on inputs distinctive from the training data set.

7. The computer implemented method of claim 1, further comprising:
   converting, by two or more processors, the DNA strand from the adding to a digital model;
   creating, by the two or more processors, a plurality of ensembles of digital models including the digital model from the converting; and
   producing, by the two or more processors, a best fit ensemble amongst the created ensembles as the machine learning model, wherein the machine learning model predicts targeted outcomes based on inputs distinctive from the training data set;
   wherein the two or more processors include one or more digital processor and one or more DNA processor.

8. A system comprising:
   a memory;
   two or more processors in communication with the memory; and
   program instructions executable by the two or more processors via the memory to perform a method for generating a machine learning model, comprising:
      building, by one or more DNA processor, a DNA strand corresponding to a conditional expectation, the conditional expectation corresponding to a feature vector from a training data set;
      amplifying, by the one or more DNA processor, nucleotides based on beta values for the conditional expectation from the building;
      encoding, by the one or more DNA processor, the amplified nucleotide as nucleobases; and
      adding, by the one or more DNA processor, the encoded nucleobases to the DNA strand from building.

9. The system of claim 8, further comprising:
   converting, by two or more processors, the DNA strand from the adding to a digital model.

10. The system of claim 8, further comprising:
    converting, by two or more processors, the DNA strand from the adding to a digital model;
    wherein the two or more processors include one or more digital processor and one or more DNA processor.

11. The system of claim 8,
    wherein the two or more processors include one or more digital processor and one or more DNA processor.

12. The system of claim 8, further comprising:
    creating a plurality of ensembles of digital models including the digital model from the converting; and
    producing a best fit ensemble amongst the created ensembles as the machine learning model.

13. The system of claim 8, further comprising:
    producing a best fit ensemble amongst created ensembles as the machine learning model, wherein the machine learning model predicts targeted outcomes based on inputs distinctive from the training data set.

14. The system of claim 8, further comprising:
    converting, by two or more processors, the DNA strand from the adding to a digital model;
    creating, by the two or more processors, a plurality of ensembles of digital models including the digital model from the converting; and
    producing, by the two or more processors, a best fit ensemble amongst the created ensembles as the machine learning model, wherein the machine learning model predicts targeted outcomes based on inputs distinctive from the training data set;
    wherein the two or more processors include one or more digital processor and one or more DNA processor.

15. A computer implemented method comprising:
- obtaining, by one or more DNA processor, a conditional expectation having a regularization metric;
- building, by the one or more DNA processor, a DNA strand corresponding to the conditional expectation from the obtaining, the conditional expectation corresponding to a feature vector from a training data set;
- amplifying, by the one or more DNA processor, nucleotides based on beta values for the conditional expectation from the building;
- encoding, by the one or more DNA processor, the amplified nucleotide as nucleobases;
- adding, by the one or more DNA processor, the encoded nucleobase to the DNA strand from building;
- receiving, by the one or more DNA processor, a regularized DNA strand having a number for nucleic acids based on a regularization method; and
- concatenating, by the one or more DNA processor, the regularized DNA from the receiving to the DNA strand from adding.

16. The computer implemented method of claim 15, further comprising:
- converting, by two or more processors, the DNA strand from the adding to a digital model;
- wherein the two or more processors include one or more digital processor and one or more DNA processor.

17. The computer implemented method of claim 15, wherein the two or more processors include one or more digital processor and one or more DNA processor.

18. The computer implemented method of claim 15, further comprising:
- producing a best fit ensemble amongst created ensembles as the machine learning model, wherein the machine learning model predicts targeted outcomes based on inputs distinctive from the training data set.

19. The computer implemented method of claim 15, further comprising:
- converting, by two or more processors, the concatenated DNA strand to a digital model;
- creating, by the two or more processors, a plurality of ensembles of digital models including the digital model from the converting; and
- producing, by the two or more processors, a best fit ensemble amongst the created ensembles as the machine learning model, wherein the machine learning model predicts targeted outcomes based on inputs distinctive from the training data set,
- wherein the two or more processors include one or more digital processor and one or more DNA processor.

20. The computer implemented method of claim 15, wherein the regularization metric is $R'(\overline{\beta})=RSS+R_n$, wherein $$RSS = \sum_{i=1}^{n}\left(y_i - \beta_0 - \sum_{j=1}^{p}\beta_0 x_{ij}\right)^2$$

indicates the Residual Sum of Squares and $$R_n = \lambda\sum_{j=1}^{p} R(\beta_i)$$

is a rank or regularization magnitude pursuant to a regularization method, wherein $$R_n = \lambda\sum_{j=1}^{p}|\beta_j|$$

if the regularization method is the Least Absolute Shrinkage and Selection Operator (LASSO), and wherein $$R_n = \lambda\sum_{j=1}^{p}\beta_j^2$$

if the regularization method is the Ridge Regression (RR).

* * * * *